United States Patent [19]
Cockrell, Jr.

[11] Patent Number: 4,877,691
[45] Date of Patent: Oct. 31, 1989

[54] SOIL RELEASE AGENT AND METHOD TO FACILITATE THE CLEANING OF OVENS USED FOR COOKING

[75] Inventor: John R. Cockrell, Jr., Greensboro, N.C.

[73] Assignee: Kay Chemical Company, Greensboro, N.C.

[21] Appl. No.: 802,313

[22] Filed: Nov. 27, 1985

[51] Int. Cl.[4] ........................ B32B 19/00; B05D 1/00; B08B 17/00

[52] U.S. Cl. ...................................... 428/688; 134/19; 134/20; 252/140; 252/156; 252/160; 252/174.25; 428/469; 428/704; 427/154; 427/156; 427/236; 427/234; 427/327; 427/397.8

[58] Field of Search ............... 427/327, 236, 239, 154, 427/156, 397.8; 252/156, 160, 145, 174.25, 140; 134/19, 20; 428/34.1, 469, 688, 704

[56] References Cited

U.S. PATENT DOCUMENTS

| | | | |
|---|---|---|---|
| 1,943,519 | 1/1934 | Denning . | |
| 2,367,918 | 1/1945 | Bartel . | |
| 3,544,366 | 12/1970 | Uhlmann . | |
| 3,658,711 | 4/1972 | Mukai et al. . | |
| 3,672,993 | 6/1972 | Mitchell et al. . | |
| 3,736,259 | 5/1973 | Buck et al. | 252/140 |
| 3,827,983 | 8/1974 | Mitchell et al. | 252/89 |
| 3,846,172 | 11/1974 | Fossati . | |
| 3,910,854 | 10/1975 | Meyer | 134/20 |
| 3,941,713 | 3/1976 | Dawson et al. | 427/156 |
| 4,019,998 | 4/1977 | Benson et al. | 252/140 |
| 4,019,999 | 4/1977 | Ohren et al. | 252/140 |
| 4,040,972 | 8/1977 | Roebke | 252/140 |
| 4,105,574 | 8/1978 | Culmone et al. . | |
| 4,131,558 | 12/1978 | Bailey et al. | 252/140 |
| 4,157,921 | 6/1979 | Baturay et al. . | |
| 4,184,975 | 1/1980 | Krings et al. | 252/140 |
| 4,214,915 | 7/1980 | Dillarstone et al. | 134/19 |
| 4,512,908 | 4/1985 | Heile | 252/140 |
| 4,528,039 | 7/1985 | Rubin et al. | 252/140 |

FOREIGN PATENT DOCUMENTS 1275740 5/1972 United Kingdom .

*Primary Examiner*—Janyce Bell
*Attorney, Agent, or Firm*—Finnegan, Henderson, Farabow, Garrett and Dunner

[57] ABSTRACT

A composition for the pre-treatment in aqueous form of a surface, preferably of an oven, which is subjected to heat and is liable to soiling by baked-on organic food deposits. A food-safe, inorganic thickening agent, in an amount sufficient so that the composition is capable of forming a continuous coating adhered to all desired portions of the preferably cleaned surface, which coating also remains continuous as the coating dries, preferably by heating, is combined with an alkaline, water-soluble inorganic salt in an amount sufficient so that the composition is readily removable with water or an aqueous solution after the composition has been dried and soiled. The composition forms a continuous film after drying. After the film becomes soiled, it can be readily removed by contact with water or an aqueous solution.

54 Claims, No Drawings

SOIL RELEASE AGENT AND METHOD TO FACILITATE THE CLEANING OF OVENS USED FOR COOKING

BACKGROUND OF THE INVENTION

The present invention relates to the cleaning of surfaces, such as the surfaces of ovens, which are subject to heat and are liable to soiling by baked-on organic food deposits. The soiling matter deposited on these surfaces consists of a complex mixture of natural fats and other organic deposits from the cooking of food. When heated at normal oven temperatures, this soiling matter is converted into a polymeric mass in which part of the organic material may also be carbonized.

The removal of this type of soil is a considerable problem, especially in restaurants where ovens are used to cook large amounts of food and the resulting soil levels are high. Removal of badly burned soils requires the use of highly alkaline, unsafe oven cleaners (typically based on sodium or potassium hydroxide) and/or laborious scrubbing and scraping. The time and effort involved are such a significant deterrent to regular cleaning, for example, on a daily basis, that restaurant ovens are often chronically soiled.

However, the most important disadvantage of these known products is the serious hazard to the eyes and skin arising from the use of caustic alkalis. It is a common practice for users to wear rubber gloves when applying a product of this type to avoid damage to the skin. Such products may also damage adjacent surfaces, such as paint, aluminum or wood, onto which they may be inadvertently applied.

Oven cleaners containing alkali materials less alkaline than caustic soda are known. For example, U.S. Pat. No. 3,658,711, issued April 25, 1972 to Mukai et al., and British Pat. No. 1,275,740 published May 24, 1972 disclose the use of alkali metal phosphates combined with an amine component or "enhancing agent" and other optional ingredients such as, for example, surfactants, abrasives, thickening agents or suspending agents. However, such oven cleaners are not very effective in saponifying baked-on fat in a relatively short period of time and, consequently, are not efficient oven cleaners. Further, such products, when applied to soiled oven surfaces, must attack the soiling matter from the outer surface, while the most severe polymerization and carbonization are generally present in the interior of the soil layer, adjacent to the oven wall.

In contrast to oven cleaners, oven pre-treatment compositions which are applied to oven surfaces prior to further soiling and then removed after further soiling are also known. For instance, U.S. Pat. No. 4,214,915, issued July 29, 1980 to Dillarstone et al., and U.S. Pat. Nos. 3,827,983 and 3,672,993, issued August 6, 1974 and June 27, 1972, respectively, to Mitchell et al., disclose the use of alkali metal bicarbonates, which Mitchell et al. suggests may be heated to decompose to the corresponding, more alkaline carbonates. However, when representative amounts of bicarbonates are heated at typical oven temperatures, the resulting dried films are pock-marked, fragile and, thus, easily damaged by scuffing or chipping when the oven is in use. Further, because the dried film does not remain continuous during the drying step, subsequent deposits of fats and other food soils burn onto the oven surface left exposed while the oven is in use.

It is evident that there is a need in the oven cleaning art for a pre-treatment composition which can be applied to an oven interior, preferably a cleaned oven interior, to produce an alkaline, food-safe coating which is continuous and adheres to all portions of oven surfaces, which remains continuous as the coating dries, preferably by heating, and which also forms a dried durable film, resistant to scuffing or chipping at typical oven heating temperatures, to prevent fats and other food soils from burning onto exposed oven surfaces. After soiling, the film and the accompanying spattered food soils should be quickly and easily removable, preferably by water alone or an aqueous solution.

SUMMARY OF THE INVENTION

It has been found, according to the present invention, that certain compositions, applied in aqueous form, are useful in forming an alkaline, food-safe coating which is continuous and adheres to all desired surfaces subjected to heat and liable to soiling, even to vertical surfaces. The coating of the invention also remains continuous as the coating dries, and the initially formed dried durable film is resistant to scuffing or chipping. Although preferred embodiments of the film at least partially rehydrate, these embodiments return to the dried, durable state at typical oven heating temperatures. Finally, the soiled film is quickly and easily removed with an aqueous solution or, surprisingly, water alone.

One aspect of the present invention is an aqueous composition useful for the pre-treatment of a surface which is subjected to heat and is liable to soiling by baked-on organic food deposits comprising:

a. a food-safe, inorganic thickening agent present in an amount sufficient so that the composition is capable of forming a continuous coating adhered to all desired portions of the surface, which coating also remains continuous as the coating dries; and
b. an alkaline, food-safe, water-soluble inorganic salt in an amount sufficient so that the composition is readily removable with water or an aqueous solution after the composition has been dried and soiled.

In another aspect of the present invention, a dried film, continuously adhered to a desired surface which is subjected to heat and is liable to soiling by baked-on organic food deposits, comprises:

a. a food-safe, inorganic thickening agent present in an amount sufficient so that the film is still continuous after drying; and
b. an alkaline, food-safe, water-soluble inorganic salt present in an amount so that the film is readily removable with water or an aqueous solution after soiling.

Still another aspect of the present invention involves a method for cleaning a surface which is subjected to heat and is liable to soiling by baked-on organic food deposits comprising the steps of:

a. applying to the surface an aqueous composition comprising:
   i. a food-safe, inorganic thickening agent present in an amount sufficient so that the composition is capable of forming a continuous coating adhered to all portions of the surface, which coating also remains continuous as the coating dries, and
   ii. an alkaline, food-safe, water-soluble inorganic salt in an amount sufficient so that the composition is readily removable with water or an aqueous solution after the composition has been dried and soiled, to form a continuous coating on the surface;

b. drying the continuous coating to form a film;
c. allowing the film to become soiled; and
d. removing the soiled film by contacting it with water or an aqueous solution.

DETAILED DESCRIPTION OF THE INVENTION

The inorganic thickening agent used in making the composition described herein may be any one of a number of natural and synthetic food-safe, inorganic materials, such as clays, silicas, aluminas, titanium dioxide (pyrogenic) and calcium and/or magnesium oxides. All of these materials are readily available commercially.

Various types of clays which are useful include kaolins such as kaolinite, dickite, nacrite, halloysite and endillite; serpentine clays such as chrysotile and amesite; smectites such as montmorillonite (derived from bentonite rock), beidellite, nontronite, hectorite, saponite and sauconite; illites or micas; glauconite; chlorites and vermiculites; attapulgite and sepiolite. Mixed-layer clays exhibiting intercalation of mineral sandwiches with one another may be used, such as, for example, mixed-layer clay mineral sheets of illite interspersed randomly or regularly with montmorillonite, or chlorite with one of the other types of clay, such as vermiculite. Other useful clays include amorphous clays, such as allophane and imogolite, and high-alumina clay minerals such as diaspore, boehmite, gibbsite and cliachite.

Various types of silicas which are useful include diatomite, precipitated silica and fumed silica.

Various types of aluminas may be used. Various types of calcium and magnesium oxides may also be employed.

The thickening agent preferably forms stable suspensions such that it stays suspended within the aqueous composition indefinitely without repeated agitation, such as shaking, by the user. Preferred thickening agents are clay materials, more preferably smectite clay materials having the following formulae:

| Mineral | Formula |
|---|---|
| montmorillonite | $[Al_{1.67}Mg_{0.33}(Na_{0.33})]Si_4O_{10}(OH)_2$* |
| beidellite | $Al_{2.17}[Al_{0.33}(Na_{0.33})Si_{3.17}]O_{10}(OH)_2$ |
| nontronite | $Fe(III)[Al_{0.33}(Na_{0.33})Si_{3.67}]O_{10}(OH)_2$ |
| hectorite | $[Mg_{2.67}Li_{0.33}(Na_{0.33})]Si_4O_{10}(OH,F)_2$ |
| saponite | $Mg_{3.00}[Al_{0.33}(Na_{0.33})Si_{3.67}]O_{10}(OH)_2$ |
| sauconite | $[Zn_{1.48}Mg_{0.14}Al_{0.74}Fe(III)_{0.40}]$<br>$[Al_{0.99}Si_{3.01}]O_{10}(OH)_2X_{0.33}$ |

*$Na_{0.33}$ or $X_{0.33}$ refers to the exchangeable base (cation) of which 0.33 equivalent is a typical value.

Of these smectite clays, montmorillonite clays derived from bentonite rock are particularly preferred. The chemical analysis for montmorillonite clay from Montmorillon, France is as follows:

| Component | % |
|---|---|
| $SiO_2$ | 51.14% |
| $Al_2O_3$ | 19.76 |
| $Fe_2O_3$ | 0.83 |
| MnO | trace |
| ZnO | 0.10 |
| MgO | 3.22 |
| CaO | 1.62 |
| $K_2O$ | 0.11 |
| $Na_2O$ | 0.04 |

Montmorillonite has a three-layer plate-shaped crystalline structure. The three-layer sheets or platelets consist of a middle octahedral alumina layer and two outer tetrahedral silica layers. Because of lattice defects in the alumina, and less often in the silica layers, the flat planar surfaces are negatively charged and have associated cations (primarily sodium and calcium) to achieve electroneutrality. Montmorillonite hydrates in the presence of water and disperses to varying degrees, depending on the nature of the cations that are loosely held and exchangeable. As hydration proceeds, the individual platelets separate and eventually form a suspension which is stabilized by electrical interactions between clay platelets and which exhibits highly non-Newtonian rheological properties.

Most preferably, the thickening agent of the invention is selected from a group of complex magnesium aluminum silicates derived from natural smectite clays by a proprietary refining process and sold by R. T. Vanderbilt Company, Inc. under the trademark VEEGUM®. Chemical analyses of these clay derivatives reveal the presence of the following compounds in the following ranges of amounts by weight percent:

| | |
|---|---|
| Silicon dioxide | 62.0–69.0% |
| Magnesium oxide | 2.9–11.9 |
| Aluminum oxide | 10.5–14.8 |
| Ferric oxide | 0.7–1.8 |
| Calcium oxide | 1.1–2.4 |
| Sodium oxide | 2.2–2.6 |
| Potassium oxide | 0.4–1.9 |
| Ignition loss | 7.5–9.0 |

A particularly preferred clay derivative is a grade commercially available from R. T. Vanderbilt Company, Inc. under the trademark VEEGUM HS® and having the chemical analysis:

| | |
|---|---|
| Silicon dioxide | 69.0% |
| Magnesium oxide | 2.9 |
| Aluminum oxide | 14.7 |
| Ferric oxide | 1.8 |
| Calcium oxide | 1.3 |
| Sodium oxide | 2.2 |
| Potassium oxide | 0.4 |
| Ignition Loss | 7.6 |

VEEGUM HS®, in particular, forms excellent suspensions having increased viscosity in water without settling out over time or completely losing pourability.

The thickening agent and all other ingredients of the composition of the present invention are preferably food-safe, that is, non-toxic even when internally consumed at abnormally high levels over an extended period of time, such as 90 days. Preferably, the thickener is one that is classified by the Food and Drug Administration as "generally recognized as safe" (GRAS) as a direct human food ingredient based upon "current good manufacturing practice conditions of use." 21 C.F.R. Ch. 1, §184.1155. An example of such a thickener is "bentonite" ($Al_2O_3.4SiO_2.nH_2O$, CAS Reg. No. 1302-78-9), which contains varying quantities of iron, alkali metal and alkaline earth metal cations in corresponding commerial products, as described at 21 C.F.R. Ch. 1, §184.1155. VEEGUM HS® clay is a type of bentonite which contains magnesium cations.

The amount of the thickening agent present in the aqueous composition must be sufficient so that the composition is capable of forming a continuous coating, with essentially no holes or gaps, and which adheres when applied to all desired surfaces of interest, particularly to vertical surfaces. The amount of the composition must also be such that the coating remains essentially continuous as the coating dries. To achieve formation of a continuous coating, which remains continuous as the coating dries, the amount of thickener present in the composition of the present invention can vary widely depending on the amount of water-soluble inorganic salt present and on the amount and character of mixing used to combine the thickener with water. However, the amount of thickener is usually from about 0.5 part to about 10 parts by weight, preferably 1.0 to 3.0 parts by weight, more preferably 2.0 to 2.5 parts by weight, and most preferably about 2.2 parts by weight. One of ordinary skill in the art can readily determine an appropriate amount of thickener.

The preferred amounts of the thickening agent are sufficient to produce a viscous, but still sprayable, liquid. Depending on the amount and type of thickener used, it may be necessary to shake the composition well before spraying.

With respect to viscosity, compositions containing many of the thickeners of the invention do not have the viscosity characteristics of Newtonian liquids in which the viscosity is constant and independent of shear rate. Instead, in many cases, the viscosity profile of the composition is such that a certain minimum amount of shear stress is required before flow takes place. Such properties may be conveniently expressed in terms of a rheological measurement—yield value.

Experience has shown that the following Casson Equation basically describes the viscosity profile of most compositions suitable for use in the present invention.

$$\eta_D^N = \eta_\infty^N + (\tau o/D)^N$$

where $\tau$ = shear stress $\tau o$ = yield value (dynes/cm$^2$)

D = shear rate (sec$^{-1}$)

$\eta_D$ = viscosity at shear rate D $\eta_\infty$ = viscosity at infinite shear N = exponent (commonly 0.5)

Assuming that N=0.5, $$\sqrt{\eta d} = \sqrt{\eta_\infty} + \sqrt{\tau o/D}$$

and multiplying through by $\sqrt{D}$, remembering that $\eta = \tau/D$, $$\sqrt{\tau} = \sqrt{\eta_\infty} \cdot \sqrt{D} + \sqrt{\tau o}$$

a plot of $\sqrt{\tau}$ vs $\sqrt{D}$ should be a straight line with a slope of $\sqrt{\eta_\infty}$ and a y intercept of $\sqrt{\tau o}$.

For the aqueous compositions of the invention, the yield value before application to appropriate surfaces should preferably be greater than about 10 dynes/cm$^2$ to prevent settling out of the contents of the composition, for example, during storage. However, the yield value should be somewhat less than about 2.5 dynes/cm$^2$ immediately after application to assure a continuous coating with essentially no gaps or holes. Further, a recovery of the yield value to about 5 dynes/cm$^2$ or higher shortly after application is desirable to prevent running or sagging of the coating. A balance exists between preventing undue sagging by prompt recovery of yield value, on one hand, and allowing sufficient time for initial flow of the composition onto the surface to form a continuous coating, on the other hand. For any given thickener useful in the present invention, one skilled in the art can routinely determine the proper balance.

Another embodiment of the invention comprises an aqueous composition not having the above-indicated yield values, but which is capable of forming a continuous coating adhered to all desired surfaces by application, for example by spraying, to a pre-heated surface.

The alkaline, water-soluble, food-safe inorganic salt of the aqueous composition can be any water-soluble salt preferably capable, either alone or in combination with a food-safe acid or base, of imparting moderate alkalinity to the composition and capable of forming, when commingled with the thickener in the composition of the invention, a dried film which is readily removable with water or an aqueous solution. Preferably, the water-soluble salt is also hygroscopic.

Examples of useful water-soluble salts include phosphates, such as monosodium phosphate, disodium phosphate and trisodium phosphate; condensed phosphates, such as sodium tripolyphosphate, tetrasodium pyrophosphate, sodium acid pyrophosphate and sodium hexametaphosphate; and the corresponding potassium and lithium phosphates such as tripotassium phosphate; alkali metal carbonates such as sodium, potassium and lithium carbonates; and soluble silicates such as sodium orthosilicate, anhydrous sodium metasilicate, pentahydrate sodium metasilicate, 2.0 ratio sodium silicate, 2.4 ratio sodium silicate and 3.22 ratio sodium silicate. Although some of these water-soluble salts are acidic, it is intended that such acidic salts be used in combination with any suitable food-safe base. As used herein, the combination of acidic water-soluble salt and food-safe base is included within the meaning of the term alkaline, water-soluble salt. A preferred group of inorganic salts includes the phosphates, with tripotassium phosphate being particularly preferred.

The amount of the alkaline, water-soluble inorganic salt present in the aqueous composition of the invention can vary widely. The maximum amount that can be present is limited only by the solubility of the salt, which can be as much as 100–200 grams of the anhydrous salt per 100 grams of water (50–67% by weight).

The minimum amount is controlled by the concentration necessary so that the composition is readily removable with water or an aqueous solution after the composition has been dried and soiled. However, when low levels of inorganic salt are used, for example, less than 0.5%, an additional amount of at least one other neutral salt such as NaCl or KCl may desirably be added to maintain a sufficiently high yield value and to assure easy and ready removability of the dried film.

Further, it may be desirable to add minor amounts of a second salt which is hygroscopic to facilitate the at least partial rehydration of the dried film. It is desirable that the dried film at least partially rehydrate because this is thought to contribute to saponification by the film of spattered fat. Preferably, the minimum amount of water-soluble inorganic salt varies from about 0.05 part to about 3.0 parts by weight of the composition.

In a particularly preferred embodiment, the amount of inorganic salt present in the composition varies from about 0.05 part to about 67 parts by weight of the composition, typically from about 5 to about 50 parts by weight, preferably from about 5 to 25 parts by weight, more preferably from about 5 to 20 parts by weight, and most preferably 10 parts by weight.

In further regard to amounts of water-soluble salt, it is contemplated that the composition of the present invention will often be used in ovens containing surfaces made of porcelain or stainless steel. Regarding those ovens having porcelain surfaces, it has been noted that using a composition of the present invention containing 15 to 25 parts by weight salt may etch the porcelain oven surfaces, which may be of aesthetic concern. It is believed that the relative proportions of the water-soluble salt and the thickening agent determine the degree of etching.

It has been found that, when using thickening agent levels of 2.0 to 3.0 parts by weight, the etching can be eliminated by using a lesser amount of salt, preferably from about 5 to less than 15 parts by weight, most preferably from about 10 to less than 15 parts by weight. For any composition, one of ordinary skill in the art can readily find an appropriate ratio of ingredients to prevent etching.

In an aqueous composition, prior to application to a desired surface, the amount of thickening agent and inorganic salt varies in terms of % by weight to the same extent as expressed above in terms of parts by weight.

The composition of the invention can further include a food-safe, alkali-stable dye. The dye, when present, helps the user of the invention to see the aqueous composition as it is being applied to appropriate surfaces which may be dimly lit, such as those inside an oven. In this way, over-application, under-application, or gaps in the continuous coating can be detected and prevented. Examples of suitable dyes include FD&C Blue #1, FD&C Yellow #6, FD&C Red #3, FD&C Green #3, FD&C Yellow #5 and mixtures thereof.

Aqueous compositions of the invention may be prepared by mixing the ingredients with water. The preferred mode of preparing these compositions is by preparing a suspension containing the thickening agent and, optionally, the food-safe, alkali-stable dye; preparing a solution of the alkaline salt in water; and, finally, combining the suspension with the solution to form the aqueous composition of the invention.

To prepare the suspension containing the thickener, the thickener is slowly added to water while agitating the mixture continuously. The rate of addition should be slow enough to avoid any agglomeration of the thickener because, with some thickeners, a rate of addition which is too fast can cause gels which do not readily disperse and cause a significant delay in production.

The temperature of the water used to make the suspension may vary widely, for example, from about 4° C. to about 60° C. The use of warm or hot water (from about 26° C. to about 60° C.) may accelerate the hydration of some thickeners and also produce a suspension of higher viscosity.

The type of mixing equipment employed is not critical, and either high or low speed mixing may be used. Examples of appropriate types of agitation for room temperature water (26° C.) include the use of a Waring Blender (3 minutes, 18,000 RPM for a 500 gram batch), an Eppenbach Homo-Mixer (15 minutes, 5,450 RPM for a 1,000 gram batch) or a Lightnin-type Mixer (30 minutes, 1,770 RPM for a 5 gallon batch). It should be noted, however, that high speed mixing, such as that obtained with the Waring Blender, will reduce the time required to obtain a smooth suspension and reduce the effect of water temperature, if any, on viscosity.

Once the suspension containing the thickener has been prepared, it is preferably diluted with an aqueous solution of the hygroscopic salt and subjected to an optional final pH adjustment and mixing. The final pH adjustment may be made with any food-grade acid, preferably an inorganic food-grade acid, or with minor amounts of strong alkali such as sodium or potassium hydroxide. Typically, the pH is adjusted with a food-grade acid such as phosphoric acid.

The pH of the aqueous composition of the invention prior to application to a desired surface can vary widely, with the lower end of the useful pH range relating to the releasability or easy removal of the dried soiled film and the higher end being limited only by the possibility of eye or skin damage. Typically, the pH ranges from about 11.0 to 14.0, preferably 11.5 to 13.0, more preferably 12.0 to 12.5, and most preferably is about 12.2 to about 12.3.

According to the method for cleaning a surface which is subjected to heat and is liable to soiling by baked-on organic food deposits, the aqueous composition is applied to the surface, preferably when the surface is in an unsoiled or cleaned state, to form a continuous coating essentially without any holes or gaps. The composition may be applied in any acceptable way, but is preferably applied by spraying, wiping, brushing or dipping.

More preferably, the composition is applied by spraying, for example, either with a hand-pump sprayer or with an aerosol spray container. If an aerosol spray container is used, the composition of the invention is packed together with about 1 to about 25% of a propellant such as isobutane, isobutane/propane, dichlorodifluoromethane (Freon 12), trichlorofluoromethane (Freon 11), dichlorotetrafluoroethane (Freon 114) and 1,1,2-trichlorotrifluoroethane (Freon 113).

After application of the aqueous composition to the appropriate surface, the resulting continuous coating is dried to form a continuous film adhered to the desired surface. The continuous coating is preferably dried by heating to drive off substantially all water to form a film which is initially durable and resistant to scuffing and chipping. However, the continuous coating may be dried by any one of several different methods, such as by allowing the coating to stand at room temperature for a predetermined period of time, heating the surface with which the coating is in contact, heating the convective air flow in contact with the coating, providing a forced flow of heated air or heating the surface prior to application of the coating.

Preferably, the continuous coating is dried by heating the convective air flow in contact with the coating, most preferably to a temperature from about 200° F. to about 550° F., for a time sufficient to form the durable film. Typical drying times range from about 10 minutes at about 400° F. to about 30–60 minutes at about 200° F.

When the coating is dried by heating, the initially durable film formed is resistant to chipping and scuffing, for example, by the insertion and removal of pans and other cooking implements into and out of an oven. By formation of such a durable film, the appropriate surfaces remain essentially covered by a protective barrier which, at the very least, physically protects the oven surfaces from burned on spattered food soils.

The continuous coating becomes substantially thinner as it dries. While the thickness of the wet continuous coating may typically vary between 0.2 and 50 mils, preferably about 2.5 mils, immediately after application, the initially durable film formed by heating the continuous coating typically only ranges from about 0.06 to about 15.0 mils, preferably between 0.6 and 1.5 mils, in thickness.

Substantially all of the water is driven from the continuous coating if it is dried by heating, and the resulting dried film typically contains less than 0.1% water at the conclusion of the drying step. However, if a hygroscopic inorganic salt is employed and if no heat is used to dry the initial coating, the dried film may still contain at least part of the original water, depending upon the ambient humidity and the particular hygroscopic salt employed.

Further, a film comprising a hygroscopic salt which is exposed to the atmosphere for a prolonged period of time may regain at least part of the original water, even if most of the water was originally lost during a drying by heating step. The physical consistency of the film in this hydrated state can be quite similar to that of stiff "cake icing" or a paste. The at least partially rehydrated film is thus not as durable as the initially dried film. However, it is found that, during normal use, the at least partially rehydrated film remains continuous and may be, of course, redried when the oven is heated.

When the film contains a hygroscopic salt which contains water either retained or absorbed from the atmosphere, the resulting state of hydration, as explained above, is thought to contribute to an ability of the film to at least partially saponify fatty food soils spattered onto the film, for example, during use of an oven used for the cooking or baking of food.

The composition of any dried film is the same as the continuous coating from which it is formed when expressed in terms of parts by weight. A dried, initially durable film generally comprises, expressed in percentage weight rather than parts by weight, from about 0.7 to about 99.5%, preferably from about 3.8 to about 37.5%, by weight of the thickener, and from about 0.5 to about 99.3%, preferably from about 62.5 to about 96.2%, by weight of the inorganic salt, immediately after the drying step.

After the drying step, the surfaces, covered with the dried film of the invention, can be used in the normal fashion and allowed to accumulate a substantial amount of spattered food soils and fats for a period of time up to several days or even weeks. When the user desires to remove the food soils accumulated on the film, such as when such a high level of soil as would be undesirable from an aesthetic or food quality standpoint has accumulated, the soiled film may be quickly and easily, i.e., readily, removed with water alone or an aqueous solution, preferably by wiping the surface with a wet cloth or paper product, sponge, scrub pad or brush.

Removal of the soiled film can be performed in less than about 45 minutes, preferably less than about 30 minutes and most preferably, in a few minutes (typically under 15 minutes, generally under 10 minutes, and often under 5 minutes), in comparison with the procedure used in cleaning surfaces with conventional oven cleaners and pre-treatment compositions, which often requires 1–2 hours, depending on the area of the surface to be cleaned, and, if a cleaner is used, two or more applications of the cleaner.

After the soiled film has been removed from the surface, the aqueous composition may be reapplied to the surface to further protect it from burned-on food soils and to continue possible saponification of spattered fatty food soils.

The following preparation illustrates how the aqueous compositions of the present invention may be prepared.

PREPARATION 1

Manufacturing Procedure

STEP 1

To 10,200 pounds of water in an ultra clean stainless steel mixing tank were added, with mixing, 8 pounds of FD&C Blue #1 Dye. With continued agitation, 460 pounds of Veegum HS ® were poured through a ¼-inch mesh galvanized screen into the water at a slow enough rate to avoid any agglomeration of the Veegum HS ®.

STEP 2

To 5,250 pounds of water in a second ultra clean stainless steel mixing tank were added, with mixing, 5,250 pounds of anhydrous food grade tripotassium phosphate. The solution exhibited an exotherm to 170° F., and was cooled to below 120° F.

STEP 3

The contents of the second tank were added to the first tank with agitation. Agitation was continued until the temperature of the mixture fell below 90° F. The pH was 12.35 and the resulting 20,988 pounds of suspension are mixed at least one hour before draining and packaging.

EXAMPLE 1

An aqueous composition comprising 2.2% by weight Veegum HS ®, 25% by weight food grade tripotassium phosphate, 0.04% by weight FD&C Blue #1 Dye, and 72.76% by weight water was sprayed, using a hand-held pump spray bottle, onto the cleaned interior surfaces of an oven in a relatively uniform, thin continuous film.

The oven was heated to about 400° F. for about 15 minutes to drive off the water in the composition and thereby form a dry, hard film which resembled dry plaster. Once dried, the coating was difficult to remove without the use of water and could tolerate incidental scuffing due to contact with cooking pans and racks on their way into or out of the oven.

After sufficient soil had collected on the dried film due to cooking to necessitate cleaning, the soiled dried film was removed rapidly and easily by wiping out the oven interior with a towel wet with water only. This operation was performed in a period of time under 10 minutes.

The aqueous composition was then reapplied and dried as described above.

EXAMPLE 2

The same procedure as Example 1 was followed using the same aqueous composition as in Example 1 except that only 10% by weight of food grade tripotassium phosphate was employed. The resulting composition exhibited a pH of 12.17 and achieved the same results as in Example 1.

EXAMPLE 3

The same procedure as Example 1 was followed except that the following four formulas (I, II, III and IV) were used in the place of the aqueous composition of the invention as described in Example 1.

| | I | II |
|---|---|---|
| Sodium bicarbonate | 1.4% w/w | 1.4% w/w |
| Potassium bicarbonate | 16.0 | 16.0 |
| Kelzan ® organic thickener | 0.7 | 0.7 |
| Miranol L2M ® surfactant | 0.5 | — |
| Water | 81.4 | 81.9 |

Formulas I and II both contain the organic thickener Kelzan and bicarbonate inorganic salts. Upon preparing the above formulations, it was noted that they exhibited a tendency to decompose spontaneously at room temperature, liberating carbon dioxide gas and causing the pH to rise (as bicarbonate was converted to carbonate). The evolved carbon dioxide caused the pressure inside the hand-held pump type sprayer container to increase, forcing liquid product out around the cap when the container was placed on its side and causing an audible rush of released gas when the container was opened.

Formulas I and II were applied to steel panels and heated in a 400° F. convection oven. The resulting dry films were blistered, riddled with holes and extremely fragile. Touching the dried film caused portions of it to flake and fall off. Upon rehydration of these films at room temperature, thin brown liquids formed, indicating decomposition of the organic thickener Kelzan.

| | III | IV |
|---|---|---|
| Sodium bicarbonate | 1.4% | 1.4% |
| Potassium bicarbonate | 16.0 | 16.0 |
| Veegum HS ® product | 5.0* | 3.0* |
| Miranol ® L2M surfactant | 0.5 | — |
| Water | 77.1 | 79.6 |

Formulas III and IV, containing an inorganic thickener and bicarbonate salts, were also applied to steel panels and heated at 400° F. The resulting dried films were pock-marked and fragile, but sufficiently strong to be used for further comparative testing.

EXAMPLE 4

A composition of the invention as described in Example 1 and compositions having Formulas III and IV as described in Example 3 were prepared and applied to the clean, cool interior surfaces of a commercial convection oven in a restaurant. With all racks removed, the compositions were generously sprayed on all inside surfaces, including sides, top, bottom, and door (except for glass window). Any overspray on the glass window of the door was wiped off to avoid blocking vision into the oven. The door was closed and the oven was heated to 400° F. for 10–15 minutes. The oven was turned off, the door opened, and the dry coating was inspected for bare spots. Any bare spots present were sprayed again with the composition. One or more days after applying the compositions, during which time a variety of foods such as meat, potatoes, biscuits, mushrooms, pies and cookies were cooked in the oven, a towel, scrub pad and very warm water were used to wipe out the interior of the oven with frequent rinsing of the towel and scrub pad.

Durable coatings resistant to scuffing and chipping and rapid, excellent cleaning were obtained with the composition of the invention. In comparison, the compositions of Formulas III and IV produced dried coatings that were very soft. Portions of these films were easily removed when incidentally bumped with a tray, such as a biscuit or bacon pan. Further, the films resulting from Formulas III and IV allowed some greasy food soil to get under the coating and burn onto the oven wall, requiring additional hard scrubbing to remove it.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

I claim:

1. A composition for the pre-treatment in aqueous form of a surface which is subjected to heat and is liable to soiling by baked-on organic food deposits consisting essentially of:
   a. a food-safe, inorganic thickening agent which is substantially insoluble in the aqueous form of said composition and which is present in an amount sufficient so that the aqueous form of said composition is capable of forming a continuous coating adhered to all desired portions of said surface, which coating also remains continuous as the coating dries; and
   b. an alkaline, food-safe, water-soluble inorganic salt in an amount sufficient so that said composition is readily removable with water or an aqueous solution after said composition has been dried and soiled.

2. The composition of claim 1 wherein said composition also includes water.

3. The composition of claim 2 wherein the composition is a sprayable liquid.

4. A composition for the pre-treatment of a surface which is subjected to heat and is liable to soiling by baked-on organic food deposits consisting essentially of:
   a. a food-safe, inorganic thickening agent which is an inorganic clay material and is present in an amount sufficient so that said composition is capable of forming a continuous coating adhered to all desired portions of said surface, which coating also remains continuous as the coating dries;
   b. an alkaline, food-safe, water-soluble inorganic salt in an amount sufficient so that said composition is readily removable with water or an aqueous solution after said composition has been dried and soiled; and
   c. water.

5. The composition of claim 4 wherein the thickening agent is a smectite clay material.

6. The composition of claim 5 wherein the thickener is derived from bentonite rock and contains predominantly montmorillonite clay.

7. The composition of claim 2 wherein the thickener is a magnesium aluminum silicate.

8. The composition of claim 7 wherein the silicate comprises 69.0% silicon dioxide, 2.9% magnesium oxide, 14.7% aluminum oxide, 1.8% ferric oxide, 1.3% calcium oxide, 2.2% sodium oxide and 0.4% potassium oxide.

9. The composition of claim 1 wherein the thickening agent is present in an amount from about 0.5 parts to about 10 parts by weight of said composition.

10. The composition of claim 9 wherein the thickening agent is present in an amount from about 1.0 parts to about 3.0 parts by weight of said composition.

11. The composition of claim 2 wherein the thickening agent is present in an amount from about 0.5% to about 10.0% by weight.

12. The composition of claim 11 wherein the thickening agent is present in an amount from about 1.0% to about 3.0% by weight.

13. The composition of claim 2 wherein the water-soluble inorganic salt is selected from the group consisting of phosphates.

14. The composition of claim 13 wherein the water-soluble inorganic salt is tripotassium phosphate.

15. The composition of claim 1 wherein the water-soluble inorganic salt is present in an amount from about 0.05 parts to about 67 parts by weight of said composition.

16. The composition of claim 2 wherein the water-soluble inorganic salt is present in an amount from about 0.05% to about 67% by weight of said composition.

17. The composition of claim 2 wherein said composition, prior to application to said surface, has a pH from about 11.0 to about 14.0.

18. The composition of claim 2 further consisting essentially of a food safe, alkali-stable dye.

19. A composition for the pre-treatment of a surface which is subjected to heat and is liable to soiling by baked-on organic food deposits consisting essentially of:

a. a food-safe, inorganic thickening agent which is a magnesium aluminum silicate, said thickening agent being present in an amount of about 2.2% by weight of said composition, so that said composition is capable of forming a continuous coating adhered to all desired portions of said surface, which coating also remains continuous as the coating dries;

b. an alkaline, food-safe, water-soluble inorganic salt which is tripotassium phosphate, said inorganic salt being present in an amount of about 5 to 25% by weight of said composition, so that said composition is readily removable with water or an aqueous solution after said composition has been dried and soiled; and c. water, wherein said composition, prior to application to said surface, has a pH of about 12.0 to 12.5, and wherein said composition further consists essentially of FD&C Blue #1 Dye in an amount of about 0.04% by weight of said composition.

20. A continuous film adhered to a desired surface which is subjected to heat and is liable to soiling by baked-on organic food deposits, said film having been dried, consisting essentially of:

a. a food-safe, inorganic thickening agent which is substantially insoluble in an alkaline aqueous composition and which is present in an amount sufficient so that said film is still continuous after said drying; and b. an alkaline, water-soluble, food-safe inorganic salt present in an amount sufficient so that said film is readily removable with water or an aqueous solution after soiling.

21. The film of claim 20 wherein said inorganic thickening agent is present in an amount from about 0.5 to about 10 parts by weight of said film and wherein said water-soluble salt is present in an amount from about 0.05 to about 67 parts by weight of said film.

22. The film of claim 20 wherein the film is about 0.06 to about 15.0 mils thick.

23. A continuous film adhered to a desired surface which is subjected to heat and is liable to soiling by baked-on organic food deposits, said film having been dried, consisting essentially of:

a. a food-safe, inorganic thickening agent which is an inorganic clay material and which is present in an amount sufficient so that said film is still continuous after said drying; and b. an alkaline, water-soluble, food-safe inorganic salt present in an amount sufficient so that said film is readily removable with water or an aqueous solution after soiling.

24. The film of claim 20 wherein the inorganic salt is tripotassium phosphate.

25. A method for cleaning a desired surface which is subjected to heat and is liable to soiling by baked-on organic food deposits comprising the steps of:

a. applying to the surface a composition consisting essentially of:

i. a food-safe, inorganic thickening agent which is substantially insoluble in said composition and which is present in an amount sufficient so that said composition is capable of forming a continuous coating adhered to all desired portions of the surface, which coating also remains continuous as the coating dries, ii. an alkaline, water-soluble, food-safe, inorganic salt in an amount sufficient so that said composition is readily removable with water or an aqueous solution after said composition has been dried and soiled, and iii. water, to form a continuous coating on the surface;

b. drying the continuous coating to form a film;

c. allowing the film to become soiled; and d. removing the soiled film by contacting it with water or an aqueous solution.

26. The method of claim 25 wherein the desired surface is an oven surface.

27. The method of claim 25 wherein the composition is a sprayable liquid.

28. A method for cleaning a desired surface which is subjected to heat and is liable to soiling by baked-on organic food deposits comprising the steps of:

a. applying to the surface a composition consisting essentially of:

i. a food-safe, inorganic thickening agent which is an inorganic clay material which is present in an amount sufficient so that said composition is capable of forming a continuous coating adhered to all desired portions of the surface, which coating also remains continuous as the coating dries, ii. an alkaline, water-soluble, food-safe, inorganic salt in an amount sufficient so that said composition is readily removable with water or an aqueous solution after said composition has been dried and soiled, and iii. water, to form a continuous coating on the surface;

b. drying the continuous coating to form a film;

c. allowing the film to become soiled; and d. removing the soiled film by contacting it with water or an aqueous solution.

29. The method of claim 28 wherein the thickening agent is a magnesium aluminum silicate consisting essentially of 69.0% silicon dioxide, 2.9% magnesium oxide, 14.7% aluminum oxide, 1.8% ferric oxide, 1.3% calcium oxide, 2.2% sodium oxide and 0.4% potassium oxide.

30. The method of claim 25 wherein the thickening agent is present in an amount from about 0.5% to about 10.0% by weight of said composition.

31. The method of claim 30 wherein the thickening agent is present in an amount from about 1.0% to about 3.0% by weight of said composition.

32. The method of claim 25 wherein the water-soluble, inorganic salt is tripotassium phosphate.

33. The method of claim 25 wherein the water-soluble, inorganic salt is present in an amount from about 0.05% to about 67% by weight.

34. The method of claim 25 wherein the composition, prior to being applied to said surface, has a pH from about 11.0to about 14.0.

35. The method of claim 25 wherein the composition is applied by spraying, wiping, brushing or dipping.

36. The method of claim 35 wherein the composition is applied by spraying.

37. The method of claim 25 wherein the continuous coating is dried by heating.

38. The method of claim 37 wherein the continuous coating is dried by heating a convective air flow to a temperature from about 200° F. to about 550° F.

39. The method of claim 25 wherein the soiled film is removed by wiping with a wet cloth or paper product.

40. The method of claim 25 further comprising the step of reapplying the composition to the surface after said removal step.

41. A method for cleaning a desired surface which is subjected to heat and is liable to soiling by baked-on organic food deposits comprising the steps of:

a. applying to the surface a composition consisting essentially of:
   i. a food-safe, inorganic thickening agent which is a smectite clay material derived from bentonite rock and contains predominantly montmorillonite clay and which is present in an amount sufficient so that said composition is capable of forming a continuous coating adhered to all desired portions of the surface, which coating also remains continuous as the coating dries,
   ii. an alkaline, water-soluble, food-safe, inorganic salt in an amount sufficient so that said composition is readily removable with water or an aqueous solution after said composition has been dried and soiled, and
   iii. water, to form a continuous coating on the surface;
b. drying the continuous coating to form a film;
c. allowing the film to become soiled;
d. removing the soiled film by contacting it with water or an aqueous solution; and
e. reapplying the composition to the surface after said removal step.

42. The method of claim 41 wherein the thickening agent is a magnesium aluminum silicate consisting essentially of 69.0% silicon dioxide, 2.9% magnesium oxide, 14.7% aluminum oxide, 1.8% ferric oxide, 1.3% calcium oxide, 2.2% sodium oxide and 0.4% potassium oxide.

43. The method of claim 40 wherein the water-soluble inorganic salt is tripotassium phosphate.

44. The method of claim 40 wherein the composition, prior to being applied to said surface, has a pH from about 11.0 to about 14.0.

45. The method of claim 40 wherein the composition is applied or reapplied by spraying.

46. The method of claim 40 wherein the continuous coating is dried by heating a convective air flow in contact with the surface to a temperature from about 200° F. to about 550° F.

47. A method for cleaning a desired surface which is subjected to heat and is liable to soiling by baked-on organic food deposits comprising the steps of:

a. applying to the surface a composition consisting essentially of:
   i. a food-safe, inorganic thickening agent which is magnesium aluminum silicate, said thickening agent being present in an amount of about 2.2% by weight of said composition, so that said composition is capable of forming a continuous coating adhered to all desired portions of the surface, which coating also remains continuous as the coating dries,
   ii. an alkaline, water-soluble, food-safe, inorganic salt which is tripotassium phosphate, said water-soluble salt being present in an amount of about 5% to 25% by weight of said composition, so that said composition is readily removable with water or an aqueous solution after said composition has been dried and soiled, and
   iii. water, to form a continuous coating on the surface, wherein the composition, prior to being applied to said surface, has a pH of about 12.0 to 12.5, and wherein the composition is applied to said surface by spraying,
b. drying the continuous coating by heating at about 400° F. to form a film,
c. allowing the film to become soiled; and
d. removing the soiled film by wiping with a wet cloth or sponge, wherein said composition also consists essentially of FD&C Blue #1 Dye in an amount of about 0.04% by weight of said composition, and wherein said desired surface is that of an oven.

48. The method of claim 40 wherein said desired surface is that of an oven.

49. The composition of claim 13 wherein the water-soluble inorganic salt is selected from the group consisting of tripotassium phosphate, sodium tripolyphosphate and potassium tripolyphosphate.

50. The film of claim 20 wherein the water-soluble inorganic salt is selected from the group consisting of tripotassium phosphate, sodium tripolyphosphate and potassium tripolyphosphate.

51. The method of claim 25 wherein the water-soluble inorganic salt is selected from the group consisting of tripotassium phosphate, sodium tripolyphosphate and potassium tripolyphosphate.

52. The method of claim 40 wherein the water-soluble inorganic salt is selected from the group consisting of tripotassium phosphate, sodium tripolyphosphate and potassium tripolyphosphate.

53. The film of claim 23 wherein the thickening agent is a smectite clay material.

54. The method of claim 28 wherein the thickening agent is a smectite clay material derived from bentonite rock and containing predominantly montmorillonite clay.

* * * * *